(12) United States Patent
Purtell et al.

(10) Patent No.: US 6,950,947 B1
(45) Date of Patent: Sep. 27, 2005

(54) SYSTEM FOR SHARING NETWORK STATE TO ENHANCE NETWORK THROUGHPUT

(75) Inventors: Andrew Purtell, Northridge, CA (US); Roger Knobbe, Torrance, CA (US); Stephen Schwab, Manhattan Beach, CA (US)

(73) Assignee: Networks Associates Technology, Inc., Santa Clara, CA (US)

(*) Notice: Subject to any disclaimer, the term of this patent is extended or adjusted under 35 U.S.C. 154(b) by 1020 days.

(21) Appl. No.: 09/597,973

(22) Filed: Jun. 20, 2000

(51) Int. Cl.$^7$ ............................................. G06F 11/30
(52) U.S. Cl. ...................... 713/201; 713/152; 370/229; 370/231; 370/235; 370/352
(58) Field of Search ............................... 713/200–201, 713/152; 709/224–229, 236; 370/229–235, 370/352–356, 252, 253, 254, 255, 256

(56) References Cited

U.S. PATENT DOCUMENTS

| | | | | |
|---|---|---|---|---|
| 5,737,531 A | * | 4/1998 | Ehley | 709/208 |
| 5,828,846 A | * | 10/1998 | Kirby et al. | 709/238 |
| 5,941,988 A | | 8/1999 | Bhagwat et al. | 713/201 |
| 6,006,268 A | * | 12/1999 | Coile et al. | 709/227 |
| 6,119,167 A | * | 9/2000 | Boyle et al. | 709/234 |
| 6,295,557 B1 | * | 9/2001 | Foss et al. | 709/224 |
| 6,298,380 B1 | * | 10/2001 | Coile et al. | 709/227 |
| 6,442,565 B1 | * | 8/2002 | Tyra et al. | 707/102 |
| 6,473,406 B1 | * | 10/2002 | Coile et al. | 370/248 |

FOREIGN PATENT DOCUMENTS

| | | | | |
|---|---|---|---|---|
| EP | 0909072 | 4/1999 | | H04L 29/06 |
| EP | 0909073 | 4/1999 | | H04L 29/06 |
| EP | 909073 A2 | * 4/1999 | | H04L 29/06 |
| EP | 0909074 | 4/1999 | | H04L 29/06 |
| EP | 0910197 | 4/1999 | | H04L 29/06 |
| EP | 0944209 | 9/1999 | | H04L 12/56 |
| WO | WO9854644 | 12/1998 | | G06F 11/00 |
| WO | WO0000879 | 1/2000 | | |
| WO | WO0002114 | 1/2000 | | G06F 1/00 |

OTHER PUBLICATIONS

Schilke, Andreas. "TCP over Satelite Links". http//www.t-kn.tu-berlin.de/curricula/ss97/bnt97/schilke.html. Jun. 5, 1997.*

"Advanced Security Proxies: An Architecture and Implementation for High-Performance Network Firewalls," Roger Knobbe, Andrew Purtell, and Stephen Schwab, *Proceedings of the DISCEX 2000 Conference*, IEEE Computer Society, Jan. 2000.

RFC 2140, "TCP Control Block Interdependence," Joe Touch, Apr. 1997.

* cited by examiner

*Primary Examiner*—Andrew Caldwell
*Assistant Examiner*—Paul Callahan
(74) *Attorney, Agent, or Firm*—Zilka-Kotab, PC; Christopher J. Hamaty

(57) ABSTRACT

Two or more computers acting as firewalls share network state data to enhance throughput performance. A firewall creates a separate common TCP control block (CCB) for each group of TCP connections through the firewall having common endpoints. The CCB is a shared data structure comprising a single microstate shared across the group of TCP connections. Each such individual TCP connection has a TCP control block, which instead of a microstate, contains a pointer to the appropriate CCB. Preferably, each firewall receives CCBs from its peers and stores them. Each firewall preferably adjusts data traffic passing through it based on the CCBs stored within it. By adjusting traffic to reduce or eliminate congestion, throughput is enhanced.

12 Claims, 6 Drawing Sheets

SYSTEM FOR SHARING NETWORK STATE TO ENHANCE NETWORK THROUGHPUT

The U.S. Government has a paid-up license in this invention and the right in limited circumstances to require the patent owner to license others on reasonable terms as provided by the terms of contract no. F30602-97-C-0336 awarded by the Defense Advanced Research Projects Agency.

BACKGROUND OF THE INVENTION

The field of invention is computer networking, and more specifically a system for sharing network state among related TCP connections to enhance network throughput.

Transmission Control Protocol (TCP) is a common and well-known protocol for transmitting data between computers over a network such as the Internet. The TCP standard is defined in RFC 793, Transmission Control Protocol. TCP divides a file or other data into packets, numbers the packets, then transmits them over a network. TCP keeps track of these packets, and reassembles them at their destination back into their original configuration. TCP is a connection-oriented protocol, which means that a connection is established between the machine transmitting data and the machine receiving data, and that connection is maintained until all of the data to be exchanged between the machines has been transmitted. The TCP standard is almost universally used in transmitting data across the Internet between a server and a client.

Data transmission over a network creates security concerns. A common method of combating threats to the security of a computer, or the security of an internal network such as a corporate network, is to provide one or more machines known as firewalls between the internal network and an external network. A firewall typically filters network packets received from the external network to determine whether to forward them to their destination on the internal network. A common type of firewall is a proxy server that makes requests to the external network on behalf of users of the internal network. For example, a user on the internal network may wish to browse a web page. Rather than connecting directly to the server, the user would connect to the proxy server, which would request the web page from the external server on behalf of the user, then examine the data served based on the access control policy implemented by that firewall. This process is typically invisible to the user.

A firewall enforces an access control policy between two networks. The firewall makes a policy decision for an individual connection based on information limited to that single connection. This information may include packet contents, source and/or destination addresses and ports, or other information. However, information regarding overall network conditions is not available at the firewall during connection setup, which is where the policy decision must be made. Instead, each TCP connection 10 has a separate TCP control block 20 that is not communicated between individual connections, as shown in FIG. 1. The TCP control block 20 is known in the art, and includes state information for a single TCP connection 10. Thus, current firewalls do not take advantage of traffic locality (i.e., repeated network transactions) between client/server pairs. Especially for proxy firewalls utilizing TCP, this may result in lower throughput than would otherwise be possible, due to the adverse impact of the slow-start data transmission mechanisms built into TCP. This process is time-consuming, relatively speaking, and typically results in decreased firewall throughput.

SUMMARY OF THE PREFERRED EMBODIMENTS

In the present invention, two or more firewalls share network state data to enhance throughput performance.

In an aspect of a preferred embodiment, a firewall creates a common TCP control block (CCB) for each group of TCP connections through the firewall having common endpoints. The CCB is a data structure that contains state data shared among the individual TCP connections within a specific group. Each individual TCP control block in a group contains a pointer to the CCB in lieu of the connection data stored within the CCB.

In another aspect of a preferred embodiment, a firewall receives CCBs from its peers and stores them for later use.

In another aspect of a preferred embodiment, each firewall adjusts data traffic passing through it based on the CCBs stored within it. By adjusting traffic to reduce or eliminate congestion, throughput is enhanced.

DETAILED DESCRIPTION OF THE PREFERRED EMBODIMENTS

Figure 2:
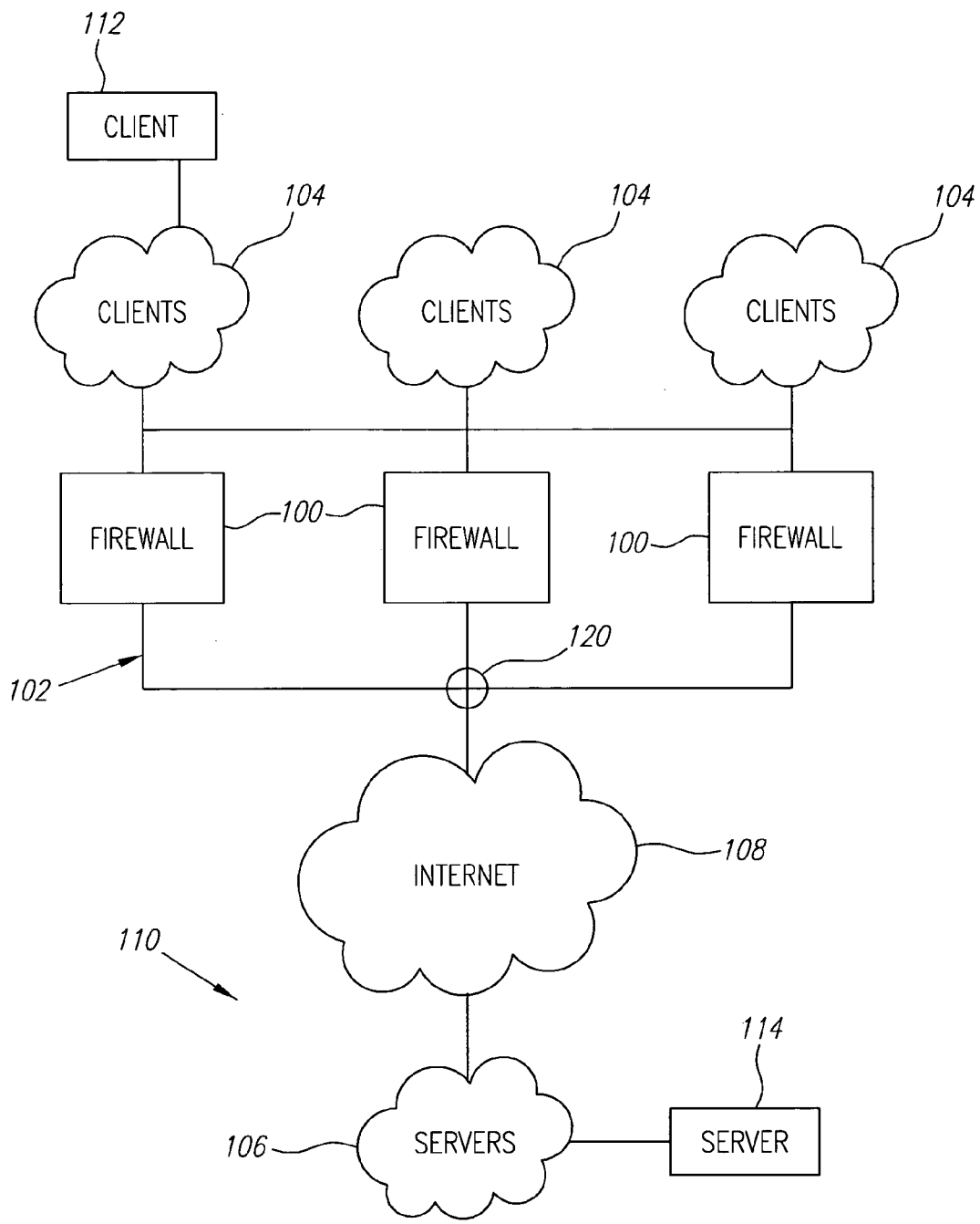
FIG. 2 is a schematic representation of an internal network connected to and protected from an external network by a number of firewalls.

Referring to FIG. 2, a diagram of networks interconnected by firewalls is shown. A number of firewalls 100 are connected together by an internal network 102. A number of clients 104 access one or more servers 106 through an electronic network such as the Internet 108, connected to the servers 106 through the firewalls 100. The combination of the Internet 108 and the servers 106 accessible through it may be referred to as the external network 110.

The term "client" is commonly used to describe a program or user requesting data in a client/server relationship, and may also be used to describe the physical hardware in which a client program is located. For the purposes of this specification, the combination of the hardware in which a client program is located and the client program itself will be referred to as a client 104. The client 104 may include any device capable of connecting to a server 106 through an electronic network such as the Internet 108, such as but not limited to a personal computer, a network appliance, or a personal digital assistant such as Palm Computing's Palm™ device. It is also within the scope of the preferred embodiment to treat a subnetwork as a client 104 in order to improve throughput to and from the subnetwork.

The term "server" is commonly used to describe a computer program that provides services to other computer programs in the same or other computers, and may also be used to describe the physical hardware in which a server program is located. In a client/server relationship, a server is used to provide data to a client that has requested that data. For the purposes of this specification, the combination of the hardware in which a server program is located and the server program itself will be referred to as a server 106. Two connected computers may switch back and forth from acting as a client to acting as a server in order to effectuate data transfer.

Groups of clients 104 are shown in FIG. 2, schematically representing that traffic between the clients 104 and the external network 110 is divided between the firewalls 100. However, a particular client 112 is preferably not limited to the use of a single firewall 100, and instead may connect to a different firewall 100 to connect to the external network 110. The particular client 112 is a subset of the group of clients 104, and is separated out for clarity. The clients 104 preferably are connected to one another behind the firewalls 100. That is, communications between clients 104 need not pass through a firewall 100.

It is within the scope of the preferred embodiment to provide a single firewall 100 between the clients 104 and the Internet 108. This configuration is advantageously used in settings where there are a small number of clients 104, or where access to the Internet 108 by the clients 104 is infrequent or the amount of data to be transferred to and from the internal network 102 is small.

In a preferred embodiment, the firewalls 100 are configured as proxy servers. The configuration and use of proxy servers as firewalls 100 is well known in the art. Typically, a proxy server receives a request from an individual client 112 for a specific resource located on a specific server 114 in the external network 110. The particular server 114 is a subset of the group of servers 106, and is separated out for clarity. The resource request is generally for a Web page, but other data may be requested by the individual client 112 as well. The proxy server then acts as a client on behalf of the individual client 112, and uses one of its own IP addresses to request the resource from the specific server 114. The specific server 114 then transmits that resource to the proxy server, which forwards the result to the individual client 112. The existence and operation of the proxy server are generally invisible to the individual client 112; all returned resources appear to the client 112 to have been transmitted directly from the specific server 114.

Figure 1:
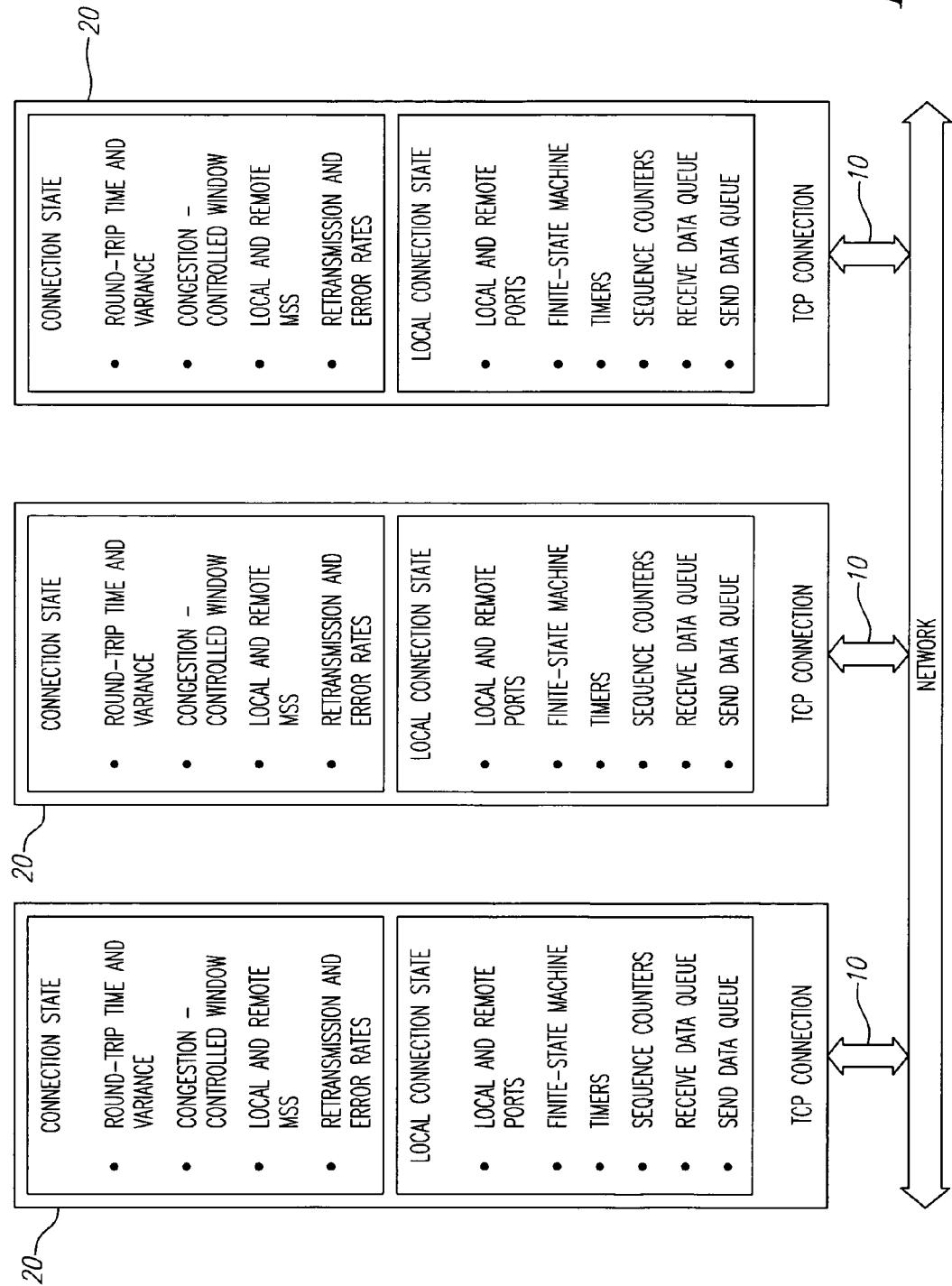
FIG. 1 is a schematic representation of a prior art implementation of TCP control blocks.

Typically, there are a number of open TCP connections between the clients 104 and the servers 106 on the external network. Each TCP connection has an associated TCP control block that maintains the state of that TCP connection. The use of a TCP control block is known to those skilled in the art; the contents of such known TCP control blocks are shown in FIG. 1. The TCP control block typically includes a local process state and a per-connection state. The local process state typically includes pointers to send and receive buffers, pointers to retransmission queue and current segment, and pointers to Internet Protocol (IP). The IP standard is well known to those skilled in the art. The per-connection state may be characterized as having a macrostate and a microstate. The macrostate describes the finite state machine, and includes the data needed to maintain that state, such as but not limited to endpoint numbers, timers, and flags. The microstate describes the protocol after a connection has been established, to maintain the reliability and congestion control of the data transferred in the connection. The microstate includes, but is not limited to, round trip time (RTT) and variance, congestion controlled window size and threshold, local and remote maximum segment size (MSS), retransmission and error rates, send and receive window state, and maximum windows seen. The characterization of the TCP control block contents as having a microstate, a macrostate and a local process state, and the contents and functions of these states, are known to those skilled in the art.

Figure 3:
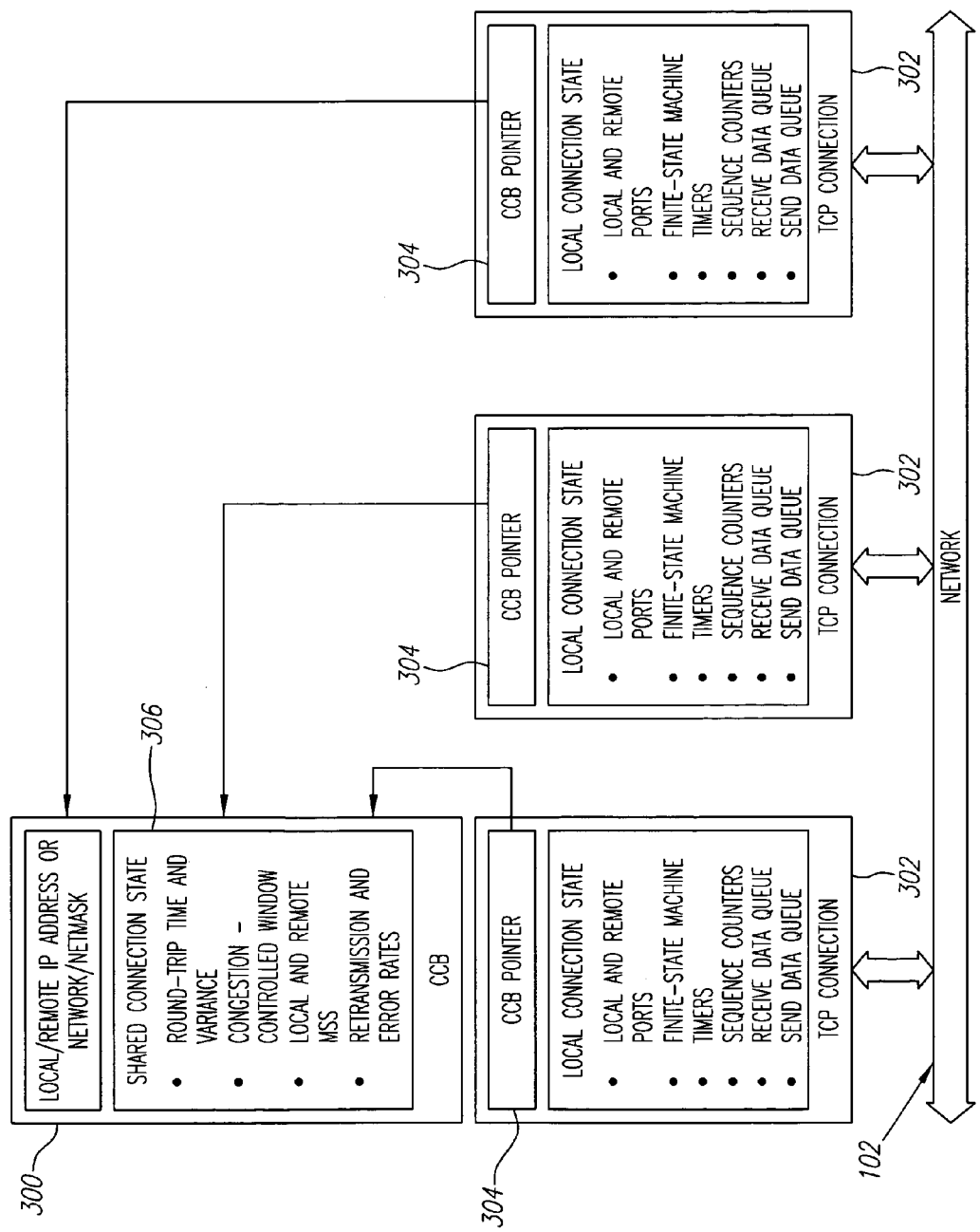
FIG. 3 is a schematic representation of TCP connection state sharing in a firewall adapted to utilize common TCP control blocks.

Referring to FIG. 3, in a preferred embodiment, one common TCP control block (CCB) 300 is created by a firewall 100 for each group of connections between that firewall 100 and a particular server 114. In a preferred embodiment, the CCB 300 comprises shared connection state data 306, which preferably includes round trip time (RTT) and variance, the congestion-controlled window, the local and remote MSS, and retransmission and error rates. Preferably, the shared connection state data 306 includes the microstate data for the TCP connection between a given firewall 100 and a particular server 114. The TCP control blocks 302 for each individual connection having a CCB 300 each include a pointer to the corresponding CCB 300 for shared connection state data 306. That is, a single CCB 300 may be simultaneously utilized by a number of different TCP connections to retain shared connection state data 306 that is accessed via a pointer in the TCP control block 302 of each connection. As an example of the usage of CCBs 300, if three connections were active between a firewall 100 and a search engine web site, and five connections were active between a firewall 100 and a business service web site, the firewall 100 would create and maintain two CCBs 300: one CCB 300 for the connections between the firewall 100 and the search engine, and one CCB 300 for the connections between the firewall 100 and the business service web site. In the example above, the three TCP control blocks 302 for the connections between the firewall 100 and the search engine each contain a pointer to shared connection state data 306 in the corresponding CCB 300, instead of individually containing the shared connection data 306 themselves.

The CCB 300 contains data, such as but not limited to round trip time and variance, that is substantially related to the physical connection between two entities connected via TCP. For example, round trip time will vary depending on the distance between and the network complexity and congestion between a firewall 102 and a particular server 114. Thus, there is advantageously only a single point of contact 120 between the internal network 102 and the external network 110. Further, the firewalls 100 are advantageously located in physical proximity to one another. Where there is a single connection 120 between the internal network 102 and the external network 114, the state components that are related to the distance between and the congestion between the internal network 102 and a particular server 114 will be substantially identical for each firewall 100. That is, the physical separation of the firewalls 100 will be negligible compared to the distance between the single point of contact 120 and the particular server 114. Thus, the shared connection state data 306 that is that is a function of the distance between the firewall 100 and a particular server 114 will be substantially identical for each firewall 100, and will be accurate and useful for each firewall 100. However, it is within the scope of the preferred embodiment to use more than one point of contact between the internal network 102 and the external network 110, or to physically separate the firewalls 100 over a distributed network, then use the shared CCBs 300 as a starting point or first approximation for a TCP connection. It is also within the scope of the preferred embodiment to utilize one or more CCBs 300 in a single firewall 100 having no network peers, or to use one or more CCBs 300 in a number of firewalls 100 without sharing CCBs 300 between firewalls 100.

Each CCB 300 is preferably stored within the firewall 100 where it is used, in order to facilitate rapid access. However, the CCB 300 may be located in another location where it is accessible to the firewall 100, such as a server or a dedicated computer connected to one or more of the firewalls 100 over the internal network 102 or through a dedicated connection.

In a preferred embodiment, each individual TCP connection sharing a single CCB 300 acts in turn as a lead connection for that CCB 300. For example, where data transfer is simultaneously occurring over three TCP connections sharing a single CCB 300, the first connection may be the initial lead connection. The CCB 300 may be updated due to state changes in the first connection. The next update to the CCB 300 would come from the second TCP connection, and after that update, the next update would come from the third TCP connection. The status of lead connection would then rotate back to the first connection. By updating the CCB 300 based on network conditions encountered by each of the TCP connections sharing it, the usefulness and accuracy of the CCB 300 for a particular client/server pair is increased.

Figure 4:
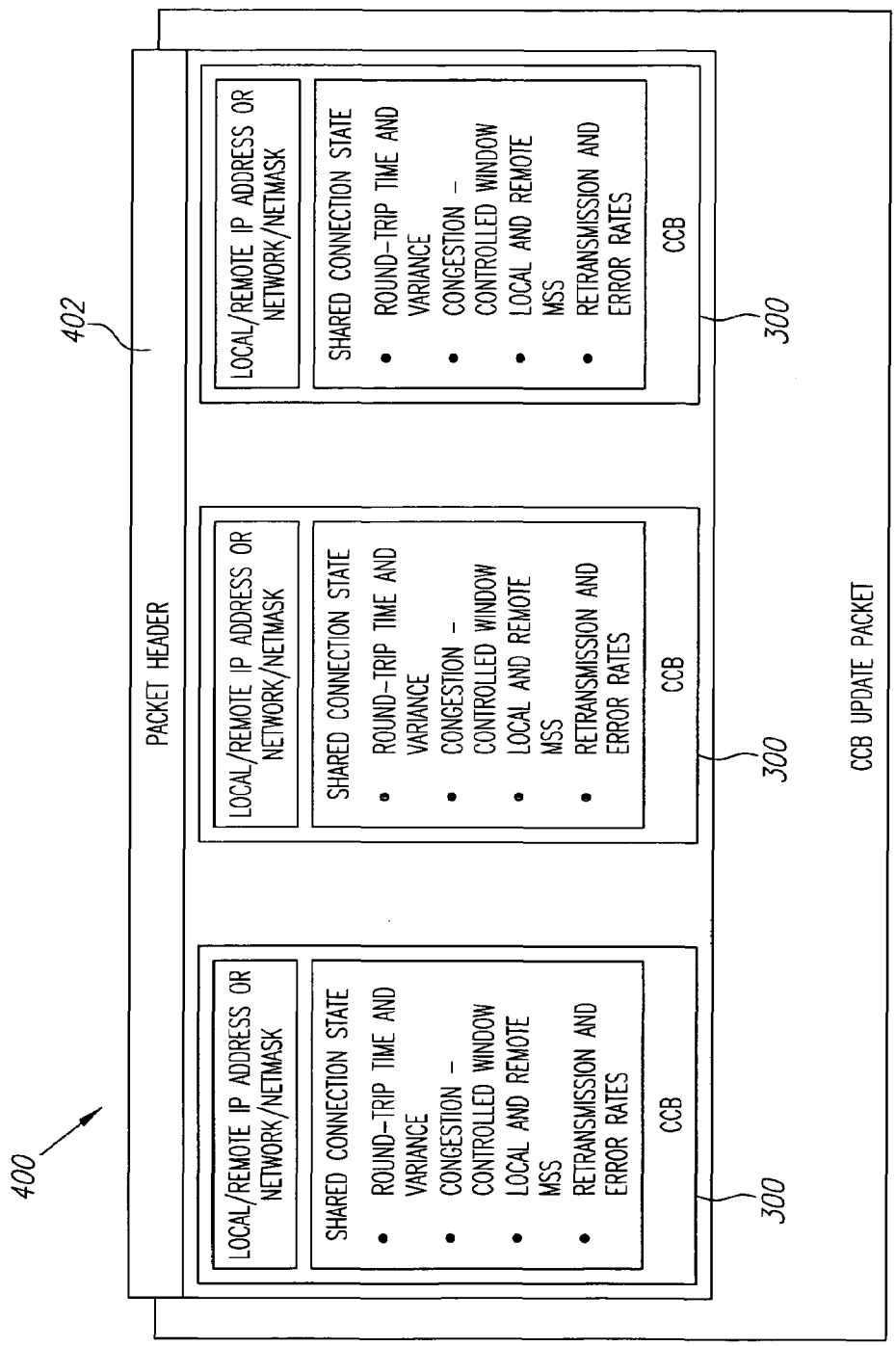
FIG. 4 is a schematic representation of a CCB update message.

Referring to FIG. 4, a CCB update packet 400 is shown. In a preferred embodiment, the CCB update packet 400 is the data structure through which a firewall 100 shares its CCBs 300 with the other firewalls 100 on the internal network 102. The CCB update packet 400 includes one or more CCBs 300. The one or more CCBs 300 in the CCB update packet 400 are copies of the one or more CCBs 300 located in the computer which originated the CCB update packet 400. The CCB update packet 400 includes a packet header 402 identifying the CCB update packet 400 and providing other information useful for properly routing the CCB update packet 400 to the appropriate firewall or firewalls 100. The use of a packet header to transmit a data packet is known in the art.

A firewall 100 may share CCBs 300 with another firewall 100 on the internal network by pushing its own CCBs 300 to one or more network peers, or by pulling CCBs 300 from one or more network peers. If the firewall 100 pushes its CCBs 300 to a network peer, the firewall 100 makes a copy of the one or more CCBs 300 associated with its TCP connections, and transmits those CCBs 300 to one or more other firewalls 100 in a CCB update packet 400. In a preferred embodiment, the firewall 100 pushes a CCB update packet 400 to its network peers on a periodic basis; that period is preferably fixed and preferably chosen to be within the range of one second to thirty seconds. A thirty-second period is advantageously utilized. Of course, the period may be less than one second or more than thirty seconds, depending on the speed of the internal network 102 and the firewalls 102, and the network conditions on the internal network 102. It is also contemplated that the period between transmission of CCB update packets 400 need not be fixed, but may vary depending on network conditions and on network traffic through the firewalls 100 between the internal network 102 and the external network 104. It is also within the scope of the preferred embodiment to issue a CCB update packet 400 from a firewall 100 only after the firewall 100 makes a new TCP connection, thus allowing the firewall 100 to provide highly current network state data to its peers.

If the firewall 100 pulls one or more CCBs 300 from a network peer, the firewall 100 transmits a request for a CCB update packet 400 to one or more other firewalls 100 on the internal network. The one or more firewalls receiving the request for a CCB update packet 400 each make a copy of the one or more CCBs 300 associated with its TCP connections and transmit those CCBs 300 to the requesting firewall 100 in a CCB update packet 400. Preferably, the requesting firewall 100 may requests CCB update packets 400 from all of its peers on the internal network. However, it is within the scope of the preferred embodiment for the requesting firewall 100 to request CCB update packets 400 from only a subset of the other firewalls 100. If only a subset of the other firewalls 100 transmit CCB update packets to the requesting firewall 100, then it will take longer for CCBs 300 to propagate across the network; indeed, some CCBs 300 may time out before spreading to all of the firewalls 100. In a preferred embodiment, a firewall 100 pulls a CCB update packet 400 from one or more of its network peers on a periodic basis; that period is preferably fixed and preferably chosen to be within the range of one second to thirty seconds. A thirty-second period is advantageously utilized. Of course, the period may be less than one second or more than thirty seconds, depending on the speed of the internal network 102 and the firewalls 102, and the network conditions on the internal network 102. It is also contemplated that the period between requests for CCB update packets 400 need not be fixed, but may vary depending on network conditions and on network traffic through the firewalls 100 between the internal network 102 and the external network 104. It is also within the scope of the preferred embodiment to request a CCB update packet 400 from another firewall 100 only before the requesting firewall 100 attempts to make a new TCP connection. It is within the scope of the preferred embodiment to switch among different means of sharing CCBs 300 over a period of time, depending on network conditions, traffic volume, number of TCP connections and other factors.

The CCB update packet 400 is preferably transmitted between firewalls 100 using the UDP standard. User Datagram Protocol (UDP) is a simpler transmission protocol than TCP, and is also well-known in the art. Unlike TCP, UDP does not divide a message into packets at the transmitting end or reassemble those packets at the receiving end. Thus, an application utilizing UDP must either itself disassemble, reassemble and check the packets, or alternately not break the transmitted data into packets at all. If small data units are exchanged, UDP may save processing time. The CCB update packet 400 preferably does not need to be broken up into smaller packets, so the use of UDP, which does not itself break data up into packets, provides an efficient low-overhead protocol for the transmission of CCB update packets 400.

When a firewall 100 receives a CCB update packet 400 from another firewall 100, the receiving firewall 100 stores the CCBs 300 that were contained in that CCB update packet 400. In the event that one of the clients 104 requests through a firewall 100 a connection to a particular server 114, and the firewall 100 has received and stored a CCB 300 for the connection between the firewall 100 and the particular server 114, the firewall 100 uses that CCB 300 to initiate the TCP connection with the particular server 114. If the CCB update packet 400 includes one or more CCBs 300 that are already present in the firewall 100, then the firewall 100 preferably ignores the duplicate CCBs 300. In a preferred embodiment, the firewall 100 retains the most recent CCB update packet 400 that it has received from each network peer that has transmitted to it a CCB update packet 400. When the firewall 100 begins originating a CCB update packet 400 for transmission to a network peer, the firewall 100 preferably checks the most-recently received CCB update packet 400 from that peer. If one of the CCBs 300 in that retained CCB update packet 400 has the same destination server 114 as a CCB 300 in use at the firewall 100, then that CCB 300 is not placed in the outgoing CCB update packet 400 transmitted to that network peer. In this way, transmission of duplicate CCBs 300 among network peers is reduced. The lifetime of an entry on the duplicate CCB list in a given firewall 100 is preferably substantially equivalent to the lifetime of a CCB 300 itself, thereby allowing the firewalls 100 to adapt to changing network conditions. In a preferred embodiment, the lifetime of a CCB 300 is substantially equal to the maximum segment lifetime (MSL) on the network. In the TCP standard, the MSL is two minutes.

Figure 5:
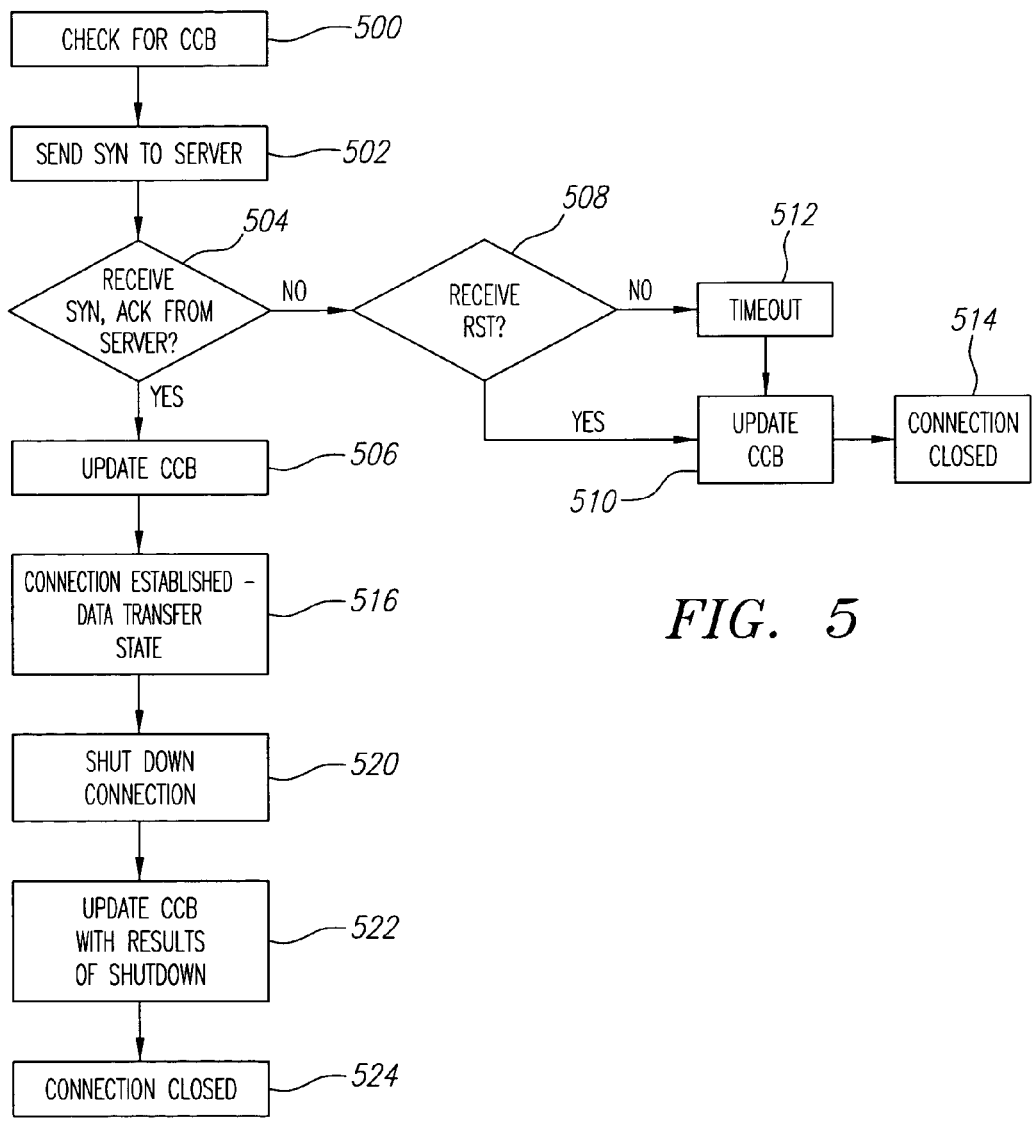
FIG. 5 is a flow chart illustrating a process for utilizing a CCB when opening a connection from a firewall to an external network.

Referring to FIG. 5, a process is shown for using a CCB 300 when opening a connection from a firewall 100 to an external network 110. In step 500, the firewall 100 receives an instruction from a particular client 112 to retrieve data, such as a web page, from a specific external server 114. The firewall 100 determines if a CCB 300 already exists that contains shared connection state data 306 for a TCP connection between the firewall 100 and the specific server 114. The presence or absence of such a CCB 300 will affect the actions taken by the firewall 100 to connect to the server 114. Next, in step 502, the firewall 100 sends a SYN flag to the specific server 114. SYN is a common abbreviation for synchronize, and is a standard TCP command for initiating a connection between a client and a server. In the next step 504, the firewall 100 determines whether a SYN and an ACK have been received back from the specific server 114. ACK stands for acknowledge, and is a flag indicating that a SYN flag sent from a first computer has been received by a second computer. The SYN flag that is sent from the server 114 back to the firewall 100 represents the attempt by the server 114 to open a connection back to the firewall 100. The response of SYN and ACK to a SYN flag is part of the TCP standard, and is well known to those skilled in the art. In step 506, if the particular server 114 has returned a SYN and ACK to the firewall 100, the firewall 100 updates the CCB 300 with the state information associated with the state of the connection between the firewall 100 and the server 114 as determined from the packet or packets containing the SYN and ACK flags. The firewall 100 then transmits an ACK to the server 114, as expected in the TCP standard, to open the other end of the connection.

However, if no SYN and ACK are received from the server 114 in step 504, the process proceeds to step 508. In step 508, the firewall 100 determines whether an RST flag has been received from the particular server 114. RST is an abbreviation for reset, and is a standard TCP command issued from a server to a client after receiving a SYN flag when the server detects a half-open connection or other anomaly. The RST flag is a well-known part of the TCP standard, and its use is well known to those skilled in the art. If the firewall 100 has received an RST flag from the particular server 114, then the process proceeds to step 510, where the firewall updates the CCB 300 with the state information associated with the state of the connection between the firewall 100 and the server 114, as determined from the packet or packets containing the RST flag. The firewall 100 then considers the connection attempt rejected. However, in step 508, if no RST flag is received from the particular server 114, the firewall 100 continues to wait for a fixed period of time for a response from the server 114. This fixed period of time is preferably substantially equal to the round trip time (RTT) estimate. Preferably, if a CCB 300 exists for the connection, then the RTT contained within the CCB is used. If no response is received from the server 114 after that fixed period of time, retransmission preferably may be attempted up to twelve times, using exponentially increasing but bounded waiting periods. For example, the waiting periods may be two times the RTT, then four times the RTT, then eight times the RTT, and so on, up to the upper bound. If no connection is established, the client 112 is notified by the firewall 100 that the connection attempt with the particular server 114 was unsuccessful. No connection is established. By storing state in a CCB 300, the firewall 100 can declare a server 114 dead if repeated connection requests go unanswered. Further connection requests to the server 114 are preferably rejected by the firewall 100, with periodic exceptions to test whether the server 114 is no longer dead or unreachable. Situations where declaring a server 114 dead may be useful include attempts to connect to a server 114 experiencing an overwhelming amount of traffic, such as a server 114 operated by a news company that is hosting popular new pictures from a space probe. By blocking attempts to initiate a connection between the firewall 100 and the server 114, substantial network congestion can be avoided. After step 512, the process proceeds to step 510, where the CCB 300 is updated to reflect that a time out occurred in response to a request for data from a particular server 114. The process from step 510 then proceeds to step 514, where the connection between the firewall 100 and the server 114 is in a closed state.

Moving back to the main branch of the process after step 506, the connection between the firewall 100 and the particular server 114 is established in step 516. This connection is a typical TCP connection in which data is transferred between the server 114 and the firewall 100. After data has been transmitted from the server 114 to the firewall 100, the firewall 100 analyzes the data in accordance with its standard policy rules and passes the data along to the specific client 112. In the prior art, data transfer begins with a slow start. That is, one packet of data is initially transferred. If the packet travels to its destination successfully, two or more packets are transferred. The process continues, ramping up the number of packets constituting each transmission until congestion or other limits affect packet transmission. However, in a preferred embodiment, the CCB 300 already contains state data regarding congestion, RTT and other state components affecting packet transmission. Thus, in a preferred embodiment, the connection between the firewall 100 and a particular server 114 is not initiated with a slow start, but rather by transmitting as many packets as the CCB 300 indicates may be safely sent without substantial congestion. In this way, data transfer is speeded and throughput between the firewall 100 and a particular server 114 is increased. Throughput over the internal network 102 is improved as well, because each TCP connection made in this manner consumes less time than an analogous prior art connection transmitting the same amount of data. The CCB 300 is preferably updated throughout the data transfer process, because the state of the TCP connection between the firewall 100 and the server 144 is subject to change throughout the data transfer process. Preferably, the CCB 300 is updated whenever the round trip time is sampled.

While terminology referring to a specific client 112 and a particular server 114 is used, it is well understood by those skilled in the art that in the course of transmitting data between these two entities, the client 112 may act as a server at some times and the server 114 may act as a client at some times. For example, if the particular client 112 is requesting a search engine web page from a particular server 114, that web page will be served back to the client 112 by the server 114. When a user types in a search request into the search engine and transmits that back to the server 114, the client 112 is temporarily acting as a server and serving data back to the server 114, which temporarily acts as a client. Indeed, it will be apparent that any data transfer process where there is a back and forth transmission of data, as opposed to a simple one-way stream, will create a situation where each connected computer acts at times as a server and at other times as a client.

After data transfer between the firewall 100 and the server 114 is complete, the process then moves to step 520, where the connection between the firewall 100 and the server 114 is shut down. This may occur in several ways. Preferably, the firewall 100 transmits a FIN flag to the specific server 114, or receives a FIN flag from the specific server 114. FIN is an abbreviation of finish, and is a TCP command that indicates that no more data is left to be transmitted from the sender. The use of the FIN flag is preferred because it allows for quick closure of connections that are no longer needed, and the consequent freeing up of valuable network resources. However, under some circumstances the connection between the firewall 100 and the particular server 114 may be shut down by a time out, which may occur when there is outstanding data to be acknowledged and the sender does not receive a response after roughly one RTT period. A series of retransmissions with exponentially increasing but bounded waiting periods are then attempted, before the connection is deemed dead and shut down by the firewall 100. Of course, the firewall 100 and the server 114 may maintain a connection after data transmission is complete; whether the connection is maintained or closed after data transmission is finished is based on the application that requested the connection, not the operating system or TCP. For example, Telnet sessions may remain quiescent for hours, days or even longer before resuming activity, if neither the source nor the destination hosts were rebooted. However, even for a long-duration connection having quiescent periods, shutdown is performed as disclosed above when the application that requested the connection closes it, or when the connection is prematurely terminated due to network problems or other errors.

In step 522, the firewall 100 updates the CCB 300 associated with the connection between the firewall 100 and the particular server 114, based on the results of the shutdown of the connection. After the CCB 300 is updated in step 522 to reflect the results of the shutdown as a component of the connection state, the connection between the firewall 100 and the particular server 114 is closed. In a preferred embodiment, the CCB 300 associated with this particular connection between the firewall 100 and the particular server 114 is retained for a duration substantially equal to the maximum segment lifetime on the network. In the TCP standard, that duration is approximately two minutes. Preferably, that CCB 300 is then deleted if it has not been used during that time.

Figure 6:
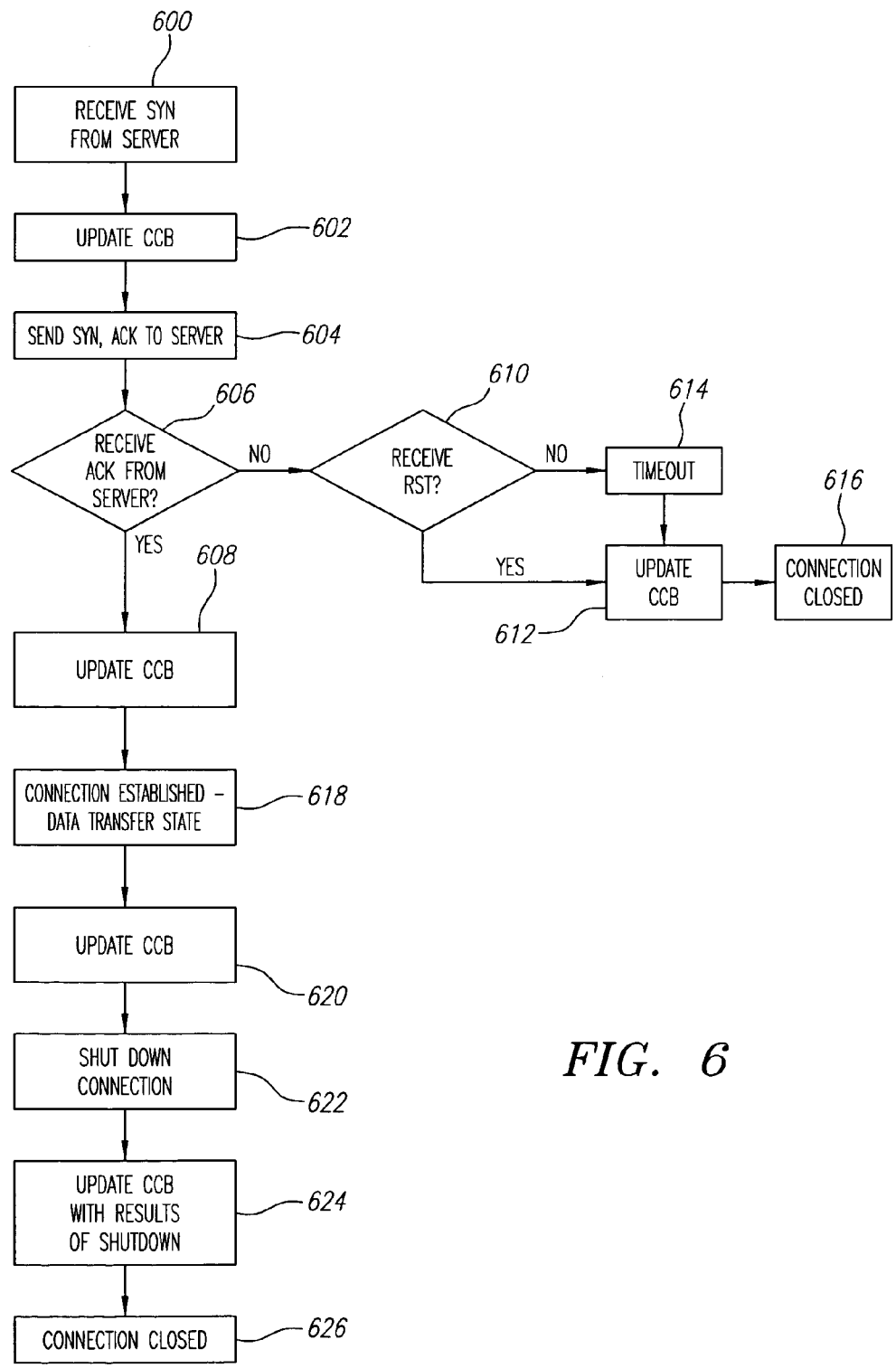
FIG. 6 is a flow chart illustrating a process for utilizing a CCB when receiving a request for connection at the firewall from an external network.

FIG. 6 shows a process for utilizing a CCB 300 when receiving a request for connection at the firewall 100 from an external network 110. In step 600, the firewall 100 receives a SYN flag from a particular server 114. Moving to step 602, the firewall 100 updates the CCB 300 associated with the state information associated with the state of the connection between the firewall 100 and the server 114, as determined from the packet or packets containing the SYN flag. Moving to step 604, the firewall 100 then sends SYN and ACK flags to the particular server 114. The ACK flag acknowledges the receipt of the SYN flag from the server 114 and the transmission of a SYN flag initiates a connection from the firewall 100 to the particular server 114. Of course, if there is a problem, the firewall 100 may send an RST flag to the server 114 instead; the server 114 will then consider the connection attempt rejected. Moving to step 606, the firewall 100 determines whether it has received an ACK flag from the particular server 114 in response to the SYN flag sent to it. If the firewall 100 has received an ACK flag from the server 114, the firewall 100 updates the CCB 300 in step 608. The connection between the firewall 100 and the server 114 is established when the firewall 100 receives the ACK flag. However, if no ACK flag is received from the particular server 114 in step 606, then in step 610 the server determines whether it has received an RST flag from the particular server 114. If so, the process moves to step 612, where the CCB 300 associated with the connection is updated to reflect the receipt of the RST flag. If in step 610 no RST flag has been received by the firewall 100, then the firewall 100 waits until the connection times out in step 614. The timing out process of step 614 is preferably the same as disclosed above in regard to step 512 of the process shown in FIG. 5. If the connection between the firewall 100 and the particular server 114 times out, the CCB 300 is updated in step 612 to reflect that. After step 612, the process moves to step 616 in which the connection between the firewall 100 and the server 114 is in a closed state.

Where an ACK flag was received from the server in step 606 and the CCB was updated in step 608, a connection is established between the firewall 100 and the particular server 114 in step 618, and data transfer occurs. The disclosure above, regarding the establishment of a connection and the transfer of data between an individual client 112 and the particular server 114 in step 516 of the process shown in FIG. 5, applies to step 618 as well. Moving to step 620, the CCB 300 is preferably updated with the connection state throughout the data transfer process, because the state of the TCP connection between the firewall 100 and the server 144 is subject to change throughout the data transfer process. Preferably, the CCB 300 is updated whenever the round trip time is sampled.

Moving to step 622, after data transfer between the particular client 114 and the particular server 114 is concluded, the connection is shutdown. This shutdown may occur by sending or receiving a FIN flag or by waiting for the connection to time out as described above in regard to step 520 of the process shown in FIG. 5. The process then moves to step 624, where the CCB 300 is updated with the results of the shutdown in step 622. That is, the type of connection shutdown is reflected in the CCB 300 as a component of the state of the connection. Moving to step 626, the connection between the firewall 100 and the particular server 114 is then closed. In a preferred embodiment, the CCB 300 associated with this particular connection between the firewall 100 and the particular server 114 is retained for a duration substantially equal to the network MSL. In the case of the TCP standard, that duration is approximately two minutes. Preferably, that CCB 300 is then deleted if it has not been used during that time.

In a preferred embodiment, each firewall 100 adjusts data traffic passing through it based on the contents of the CCBs 300 stored within it. The CCBs 300 provide an individual firewall 100 with data regarding the overall conditions on the internal network 102. The policy decisions made by the firewall 100 are based on concerns including security, bandwidth, and resource utilization. By utilizing data regarding the state of the internal network 102, the firewall 100 can make better policy decisions that allow for enhanced throughput between the internal network 102 and the external network 110. In a preferred embodiment, each firewall 100 periodically reviews the CCBs 300 stored within it to determine of the overall state of the internal network 102. Preferably, that individual firewall 100 then adjusts the data traffic through it, based on the data traffic through its network peers.

Each individual firewall 100 preferably adjusts the data rate through itself to minimize or prevent network saturation. Network saturation is a problem, known to those skilled in the art, that can result in data loss or in reduced throughput between two networks. Network saturation occurs when the firewalls 100 attempt to transmit more data packets between the internal network 102 and the external network 110 than available bandwidth can support. For example, saturation occurs when the internal network 102 is capable of receiving X packets per second from the external network 110 but the external network is transmitting X+1 packets per second or more to the internal network 102. If an individual firewall 100 is aware of the data transmission rates for the connections originating at that firewall 100, as well as the data rates and shared connection state data 306 for its network peers, that firewall 110 can adjust the rate of the connections through itself to prevent saturation. By sharing CCBs 300 on a relatively frequent basis, preferably at intervals of one to thirty seconds, each firewall 100 obtains a substantially current picture of the overall state of the internal network 102. If one firewall 100 suddenly requires additional band width to handle data requests through it, its network peers preferably reduce the data traffic rate through themselves to prevent network saturation. Those network peers have the knowledge to reduce that data traffic rate based on the shared connection state data 306 within the CCBs 300 they have received from the firewall 100 requiring additional bandwidth. Because the CCBs 300 provide knowledge to a firewall 100 of the behavior of its network peers, throughput can be improved by allowing each firewall 100 to better adjust the traffic through itself to reduce or prevent network saturation.

A preferred system for sharing network state to enhance throughput, and many of its attendant advantages, has thus been disclosed. It will be apparent, however, that various changes may be made in the content and arrangement of the steps of the process without departing from the spirit and scope of the invention, the method hereinbefore described being merely preferred or exemplary embodiments thereof. Therefore, the invention is not to be restricted or limited except in accordance with the following claims and their legal equivalents.

What is claimed is:

1. A method for enhancing network throughput between an internal network and an external network to which a server is connected, comprising the steps of:
   connecting two or more firewalls to the internal network;
   determining whether a common TCP control block exists for a TCP connection between one of said firewalls and the server, and creating one if one does not exist;
   sending a TCP connection request to the server from one of said firewalls; and
   updating said common TCP control block based on the response from the server to said TCP connection request;
   wherein said steps further comprise establishing a connection between said firewall and said server, and updating said common TCP control block with connection state data during said connection;
   wherein said steps further comprise shutting down said connection, and updating said common TCP control block based on the type of shutdown performed;
   wherein said common TCP control block is shared with one or more of said other firewalls.

2. The method of claim 1, wherein the external network includes the Internet.

3. A method for enhancing network throughput between an internal network and an external network to which a server is connected, comprising the steps of:
   connecting two or more firewalls to the internal network;
   receiving a TCP connection request from the server to one of said firewalls;
   determining whether a common TCP control block exists for a TCP connection between said receiving firewall and said server, and creating one if one does not exist; and
   updating said common TCP control block based on the TCP connection request from the server;
   wherein said steps further comprise transmitting an acknowledgement and a request for connection to the server, and updating said common TCP control block with the resulting connection state data;
   wherein said steps further comprise establishing a connection between said firewall and the server and updating said common TCP control block during said connection with connection state data;
   wherein said steps further comprise shutting down said connection, and updating said common TCP control block based on the type of shutdown performed;
   wherein said common TCP control block is shared with one or more of said other firewalls.

4. The method of claim 3, wherein the external network includes the Internet.

5. A computer program product embodied on a computer readable medium for enhancing network throughput between an internal network and an external network to which a server is connected, comprising:
   computer code for connecting two or more firewalls to the internal network;
   computer code for determining whether a common TCP control block exists for a TCP connection between one of said firewalls and the server, and creating one if one does not exist;
   computer code for sending a TCP connection request to the server from one of said firewalls; and
   computer code for updating said common TCP control block based on the response from the server to said TCP connection request;
   wherein a connection is established between said firewall and said server, and said common TCP control block is updated with connection state data during said connection;
   wherein said connection is shut down, and said common TCP control block is updated based on the type of shutdown performed;
   wherein said common TCP control block is shared with one or more of said other firewalls.

6. The computer program product of claim 5, wherein the external network includes the Internet.

7. A computer program product embodied on a computer readable medium for enhancing network throughput between an internal network and an external network to which a server is connected, comprising:
   computer code for connecting two or more firewalls to the internal network;

computer code for receiving a TCP connection request from the server to one of said firewalls;

computer code for determining whether a common TCP control block exists for a TCP connection between said receiving firewall and said server, and creating one if one does not exist; and computer code for updating said common TCP control block based on the TCP connection request from the server;

wherein an acknowledgement and a request for connection is sent to the server, and said common TCP control block is updated with the resulting connection state data;

wherein a connection is established between said firewall and the server, and said common TCP control block is updated during said connection with connection state data;

wherein said connection is shut down, and said common TCP control block is updated based on the type of shutdown performed;

wherein said common TCP control block is shared with one or more of said other firewalls.

8. The computer program product of claim 7, wherein the external network includes the Internet.

9. An apparatus for enhancing network throughput between an internal network and an external network to which a server is connected, comprising:

logic for connecting two or more firewalls to the internal network;

logic for determining whether a common TCP control block exists for a TCP connection between one of said firewalls and the server, and creating one if one does not exist;

logic for sending a TCP connection request to the server from one of said firewalls; and logic for updating said common TCP control block based on the response from the server to said TCP connection request;

wherein a connection is established between said firewall and said server, and said common TCP control block is updated with connection state data during said connection;

wherein said connection is shut down, and said common TCP control block is updated based on the type of shutdown performed;

wherein said common TCP control block is shared with one or more of said other firewalls.

10. The apparatus of claim 9, wherein the external network includes the Internet.

11. An apparatus for enhancing network throughput between an internal network and an external network to which a server is connected, comprising:

logic for connecting two or more firewalls to the internal network;

logic for receiving a TCP connection request from the server to one of said firewalls;

logic for determining whether a common TCP control block exists for a TCP connection between said receiving firewall and said server, and creating one if one does not exist; and logic for updating said common TCP control block based on the TCP connection request from the server;

wherein an acknowledgement and a request for connection is sent to the server, and said common TCP control block is updated with the resulting connection state data;

wherein a connection is established between said firewall and the server, and said common TCP control block is updated during said connection with connection state data;

wherein said connection is shut down, and said common TCP control block is updated based on the type of shutdown performed;

wherein said common TCP control block is shared with one or more of said other firewalls.

12. The apparatus of claim 11, wherein the external network includes the Internet.

* * * * *